United States Patent [19]
Lipczynski et al.

[11] Patent Number: 6,086,452
[45] Date of Patent: Jul. 11, 2000

[54] METHOD OF HIGH SPEED CENTRIFUGAL RUN-OUT GRINDING OF A PNEUMATIC TIRE

[75] Inventors: George Jeffrey Lipczynski, Hudson; Gino Salvador Vicini, Mogadore; John Michael Maloney, Medina, all of Ohio

[73] Assignee: The Goodyear Tire & Rubber Company, Akron, Ohio

[21] Appl. No.: 09/180,058

[22] PCT Filed: Aug. 2, 1996

[86] PCT No.: PCT/US96/12845

§ 371 Date: Oct. 29, 1998

§ 102(e) Date: Oct. 29, 1998

[87] PCT Pub. No.: WO98/05937

PCT Pub. Date: Feb. 12, 1998

[51] Int. Cl.[7] .............................. B24B 1/00; B24B 49/02
[52] U.S. Cl. ....................... 451/5; 241/DIG. 31; 451/8; 451/10; 451/24; 451/49; 451/57
[58] Field of Search ...................... 157/13; 241/DIG. 31; 451/1, 5, 8, 10, 11, 24, 49, 57, 254, 520

[56] References Cited

U.S. PATENT DOCUMENTS

| | | | |
|---|---|---|---|
| 3,553,903 | 1/1971 | Christie | 451/920 X |
| 3,574,973 | 4/1971 | Rader . | |
| 3,739,533 | 6/1973 | Iida et al. . | |
| 3,835,591 | 9/1974 | Cimprich | 451/920 X |
| 3,841,033 | 10/1974 | Appleby et al. | 451/920 X |
| 3,848,369 | 11/1974 | Monajjem | 451/920 X |
| 3,946,527 | 3/1976 | Beer . | |
| 3,963,427 | 6/1976 | Ugo | 451/920 X |
| 4,016,020 | 4/1977 | Ongaro | 451/920 X |
| 4,914,869 | 4/1990 | Bayonnet et al. | 451/5 |
| 5,103,595 | 4/1992 | Dale et al. | 451/5 |
| 5,263,284 | 11/1993 | Wild . | |
| 5,645,465 | 7/1997 | Vannan, III | 451/5 |
| 5,773,731 | 6/1998 | Sakakura et al. | 451/5 X |

FOREIGN PATENT DOCUMENTS

| | | |
|---|---|---|
| 0130759 | 1/1985 | European Pat. Off. . |
| 0342773 | 11/1989 | European Pat. Off. . |

*Primary Examiner*—Timothy V. Eley
*Attorney, Agent, or Firm*—Howard M. Cohn

[57] ABSTRACT

A method for correcting the radial run-out and radial force variation of a pneumatic tire (12) with a tire uniformity machine (10). The tire is rotated at a high speed and radial run-out is measured. A center grinder assembly (24) is incrementally advanced into contact with sections of the tire having intrinsic radial run-out until all values of radial run-out about the tread circumference are within an acceptable value of radial run-out. In addition to the advancement of the center grinder assembly (24), top and bottom tread shoulder grinders (40A, 40B) may be advanced into contact with sections of the tire having phase adjusted lateral run-out. The extent of the advancement of the shoulder grinders into contact with the tread shoulders of the tire is dictated by a control signal generated by a computer program from the initial measurements of radial run-out. Tangential force variations of the tire occurring when the tire is rotating at a high speed are also expected to be reduced due to the grinding of the tire.

8 Claims, 4 Drawing Sheets

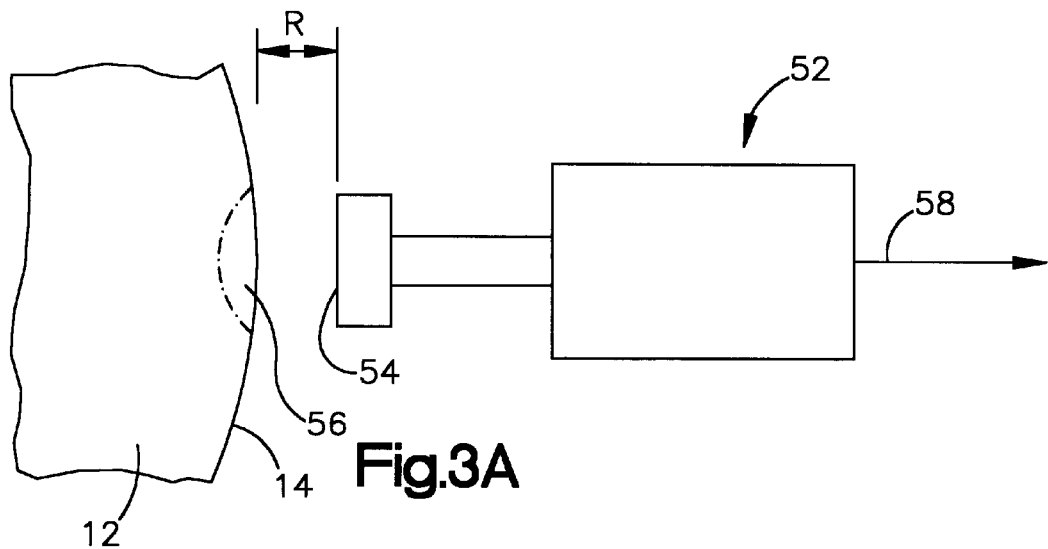
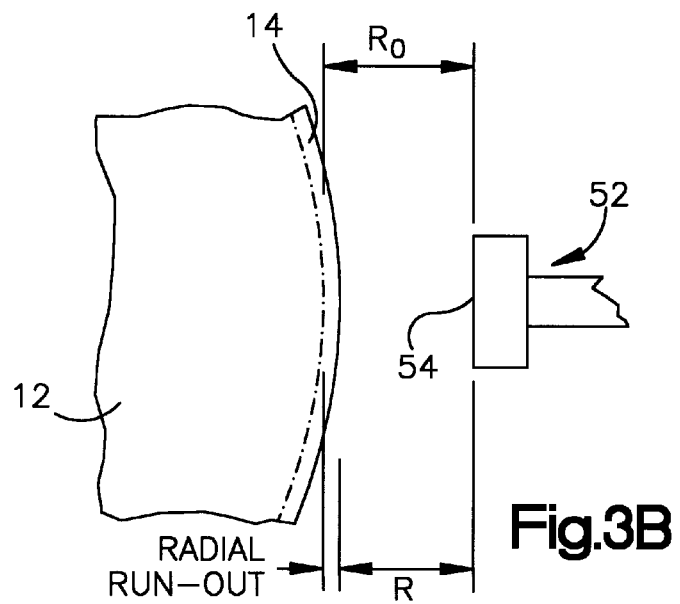

METHOD OF HIGH SPEED CENTRIFUGAL RUN-OUT GRINDING OF A PNEUMATIC TIRE

FIELD OF THE INVENTION

This invention relates to the field of optimizing pneumatic tire uniformity, and more particularly, to a method for correcting radial run-out, and radial force variations by grinding the tread surface of a pneumatic tire with a tire uniformity machine.

BACKGROUND OF THE INVENTION

The monitoring and correction of tire non-uniformities are important aspects of the art of manufacturing pneumatic tires. Tire non-uniformities include dimensional variations, such as differences in the dimensions of the belts, beads, liners, and treads of the tires, differences in material properties (e.g. rubber stiffness), and flaws in the cosmetic appearance of the tires. Whatever the type of non-uniformity, they all result from variations in the manufacturing process. For example, dimensional variations may be caused by rubber flow in the tire molds, out-of-round curing bladders or tire molds, off-center loading at press, snaked treads or belts, tilted beads, tilted carcasses relative to belts, and tilted tires in the mold. Often, more than one source of variation may compound the extent of a non-uniformity; for example, non-uniform tire stiffness may result from both tire thickness variation and from variations in the stiffness property of the rubber itself.

Two dimensional non-uniformities of special importance are radial run-out and lateral run-out. Radial run-out is the variation in the tread radius of a tire, also referred to as tire "out-of-roundness". The primary production variations causing radial run-out are stretched components, wide component splices, grouped component splices, an out-of-round curing bladder, mold or building drum, eccentric carcass relative to belts, snaked chafer, and off-center loading at press. Radial run-out is monitored during tire production not only because it indicates dimensional variations, but also due to the fact that these non-uniformities contribute to certain force variations and tire imbalances, as discussed below.

Tire non-uniformities may cause one or more of the following effects on tire performance: force variations, imbalance forces and moments, conicity, ply steer and residual self-aligning torque. When non-uniformities are of a sufficient magnitude, the resulting force variations, imbalances, etc., will exceed an acceptable amount and the ride of the vehicle to which such tires are mounted will be adversely affected. As a tire rolls upon a surface, it transmits forces, for example, vehicle weight or centrifugal force, from the vehicle to which it is attached to that surface. Arising from these forces transmitted to the surface are equal and opposite reaction forces exerted by the road on the vehicle as transmitted through the tires.

Force variations are fluctuations in the magnitude of the forces which are exerted by a tire to a road surface on which it rolls, thus causing fluctuations in the reaction forces experienced by the vehicle. These variations in the forces are caused by differences in tire stiffness and/or geometry of the tire about its circumference or tread centerline and depend on which increment of the tire tread is contacting the road surface at a particular time. As an illustration of force variation, a perfectly round tire on a four wheel vehicle may be expected to transmit a constant force of ¼ of the total weight of the vehicle to the surface, with the corresponding reaction force conveyed to the vehicle, as the vehicle travels. However, if there is a low spot on a tire (i.e. due to differences in radial run-out), during the time when that spot rolls over the surface, the distance from tire axis to the road surface at that corner of the vehicle will be slightly less than at the other three corners of the vehicle. This causes a decrease in the force exerted by the tire on the road, with a corresponding decrease in the reaction force transmitted to the vehicle, during the moment when the low spot is rolling over the surface. This decrease in the force exerted on the road and the reaction force transmitted to the vehicle is repeated during every revolution of the tire. The periodic fluctuation of the reaction force transmitted to the vehicle is experienced as a vibrational or acoustical disturbance of the ride of the vehicle.

Force variations include radial force variation, lateral force variation, and tangential force variation. Radial force variation is caused by radial run-out and variations in radial stiffness and is exerted in the radial direction of the tire, or in a direction perpendicular to the axis of rotation and non-tangential to the road surface. Radial force variation causes roughness to the vehicle ride at various speeds. Radial force variation is easily measurable by a variety of standard methods.

Tangential force variation is a more complex phenomena than the two discussed above. Tangential force variation, or fore-aft force variation, is experienced at the surface of contact between tire and road surface in a direction both tangential to the tire tread and perpendicular to the tire axis of rotation. Tangential force variations are very speed dependent and are experienced as a "push-pull" effect on a tire, which can be analogized to the sensation of a wheel barrow traveling over a bump in the road, i.e. increased force as the wheel barrow is pushed up the bump and decreased force as the wheel barrow travels down the bump. Investigations have shown that there are multiple mechanisms active in causing tangential force variation. However, to date, the tangential force variation are essentially unmeasurable on a typical production low speed tire uniformity machine, as discussed in more detail below, which operates at a speed, such as 60 revolutions per minute (RPM). Instead, tangential force variation can only be measured at highway speed or above, using a high speed laboratory tire uniformity machine, such as a Model HSU-1064, available from the Akron Standard Co. of Akron Ohio. Because of the low productivity and expense of the laboratory tire uniformity machine, the tangential force variation parameter can only be measured by sample methods. Still, tangential force variation does represent a tire uniformity characteristic for which 100% testing and correction would be preferred, if available.

In the usual tire manufacturing process, tires are placed first in a production tire uniformity machine to correct force variations and then placed in a tire balancing machine to check for unacceptable imbalance. A number of methods have been developed to correct excessive force variations by removal of rubber from the shoulders and/or the central region of the tire tread by means such as grinding. Most of these correction methods include the steps of indexing the tire tread into a series of circumferential increments and obtaining a series of force measurements representative of the force exerted by the tire as these increments contact a surface. This data is then interpreted and rubber is removed from the tire tread in a pattern generated by this interpretation.

Force variation correction methods are commonly performed with a production tire uniformity machine (TUM), which includes an assembly for rotating a test tire against the surface of a freely rotating loading wheel. Typically, the tire is rotated at a low speed of about 60 rpm. In such an arrangement, the loading wheel is moved in a manner dependent on the forces exerted by the rotating tire and those forces are measured by appropriately placed measuring devices. When a tire being tested yields less than acceptable results, shoulder and center rib grinders are used to remove a small amount of the tire tread at precisely the location of non-uniformities detected by the measuring devices. As the tire is rotated, it is measured and ground simultaneously. In a sophisticated, low speed production tire uniformity machine, such as a Model No. D70LTX available from the Akron Standard Co. of Akron Ohio, the force measurements are interpreted by a computer and rubber is removed from the tire tread using grinders controlled by the computer. Examples of tire uniformity machines utilizing these methods are disclosed in U.S. Pat. Nos. 3,739,533, 3,946,527, 4,914,869, and 5,263,284.

OBJECTS OF THE INVENTION

It is an object of the present invention to provide a method for correcting run-out and force variations of a pneumatic tire on a tire uniformity machine.

Another object of the present invention is to provide a method for simultaneously correcting radial run-out, and radial force variations of a pneumatic tire on a tire uniformity machine.

Yet another object of the present invention is to grind a tire on a tire uniformity machine to reduce tangential force variation.

Other objects of this invention will be apparent from the following description and claims.

SUMMARY OF THE INVENTION

In accordance with the present invention, there is provided a method for correcting radial run-out, radial and lateral force variations, and static and couple imbalances of pneumatic tires on a tire uniformity machine. The routine for correcting the radial run-out and radial force variation of pneumatic tires on a tire uniformity machine includes the steps of first rotating a tire, at a high speed on a tire uniformity machine. Then, a center grinder is incrementally advanced towards the center of the tire and material is removed from the circumferential tread of the tire with each incremental advance of the grinder. Simultaneously, radial run-out is measured until the radial run-out at all points about the circumference of the tire are within an acceptable limit of radial run-out. The method of the present invention is expected to reduce tangential force variation due to the effect of grinding the tire while the tire is rotating at a high speed.

BRIEF DESCRIPTION OF THE DRAWINGS

The structure, operation, and advantages of the presently preferred embodiment of the invention will become further apparent upon consideration of the following description taken in conjunction with the accompanying drawings, wherein:

FIGS. 3A and 3B, collectively FIG. 3, are detailed views of a radial run-out sensor;

FIG. 6, are side views of a simplified tread element of a typical pneumatic tire to demonstrate the cantilever behavior of such tread elements, shown before and during contact with a grinding wheel.

DETAILED DESCRIPTION OF THE INVENTION

Figure 1:
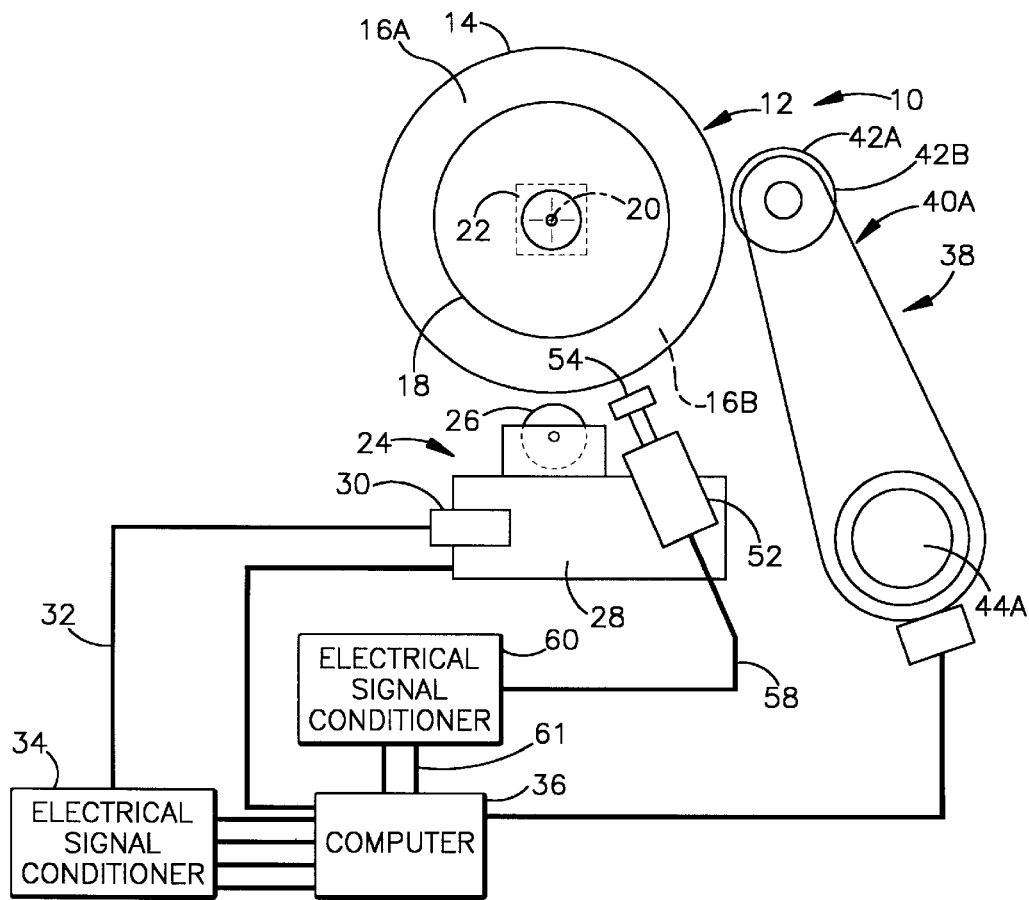
FIG. 1 is a schematic illustration of a force variation machine in accordance with the invention.

Referring to FIG. 1, there is illustrated a typical tire uniformity machine (TUM) 10 in accordance with the present invention. Mounted on the TUM 10 is a tire 12, which is typically a pneumatic tire having a circumferential tire tread 14, with top and bottom shoulder regions and a central region between the top and bottom shoulder regions, and sidewalls 16A,16B. The tire 12 can be mounted on a rim 18 secured to a tire spindle 20 and inflated to a desired pressure. A variable speed motor 22, shown with phantom lines, rotates the tire spindle 20 and rim 18, thus enabling tire 12 to be brought to and maintained at desired rotational speeds.

Figure 2:
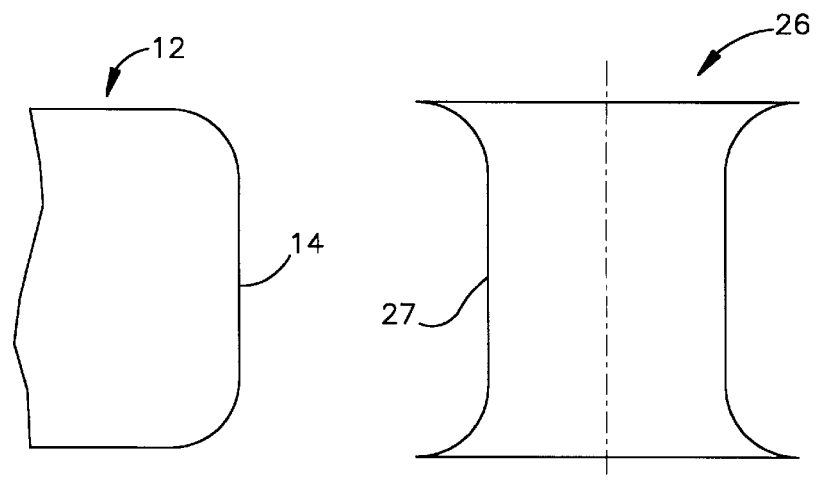
FIG. 2 is a side view of a full-faced grindstone, shown adjacent a partial side view of a tire.

A center grinder assembly 24 is located adjacent to wheel 12 and has a grinding wheel 26 that is actuated by a motor 28, as shown in FIG. 1. In the preferred embodiment of the present invention, grinding wheel 26 is a full-faced grinding wheel with a grinding face 27 having the tire mold profile as shown in FIG. 2. It is, however, within the scope of the present invention to use other shapes or sizes for grinding wheel 26. Grinding wheel 26 is moved into and out of engagement with the central region of the tread 14 of tire 12 by a servo positioner (not shown), such as a conventional hydraulic servo device. A current/power transducer 30 is connected to motor 28 to monitor the amount of rubber removed and or rate of removal. Voltage signals proportionate to the current/power flowing to motor 28 are generated by current/power transducer 30 and inputted through a line 32 into an electric signal conditioner 34. Electric signal conditioner 34 converts these voltage signals into signals which can be inputted and stored in a computer 36. A shoulder grinder assembly 38 is located approximately 90° clockwise about tire 12 from center grinder assembly 24 and adjacent to the outside diameter of tire 12. Shoulder grinder assembly 38 includes substantially identical top shoulder grinder 40A and bottom shoulder grinder 40B (pointed to by "40B" in FIG. 1 but not shown, as it is directly behind the top shoulder grinder 40A.) which each include a grinding wheel 42A that is actuated by a motor 44A. Each grinder 40A,40B is independently moved into and out of engagement with the tread shoulder regions of circumferential tread 14 of tire 12. As shown in FIG. 1, top shoulder grinder 40A can be moved into and out of engagement with the top shoulder portions of tread 14 by any conventional means, such as hydraulic servo devices (not shown).

Computer 36 is conventionally programmed to determine the radial run-out and radial force values of the tire 12 and to control any necessary corrective grinding action, as discussed in U.S. patent application Ser. No. 08/534,809, entitled METHOD OF CORRECTING CONICITY, RADIAL RUN OUT, AND FORCE VARIATIONS IN A PNEUMATIC TIRE, assigned to the assignee of the present invention Goodyear Tire & Rubber Co., and incorporated in its entirety by reference herein. Computer 36 is connected to center grinder assembly 24 and shoulder grinder assembly 38 to position and operate the grinding assemblies as required.

Referring to FIGS. 1 and 3, a radial run-out sensor 52 is preferably mounted to center grinder assembly 24 by conventional means (not shown). However, it is also within the scope of the present invention to movably mount radial run-out sensor 52 at any location on TUM 10 in a manner which enables sensing face 54 of sensor 52 to be securely located at a fixed position in near proximity to the center of circumferential tread 14 of tire 12 and also enables adjustment of the location of sensing face 54 to allow for force correction of tires of different diameters. In the preferred embodiment, radial run-out sensor 52 is a commercially available, no-contact probe. A no-contact probe is most desirable for the high operating speeds preferred. However, it is also within the scope of the present invention to substitute other means for radial run-out sensor 52, such as a mechanical contact probe. In the latter case, radial run-out sensor 52 would be mounted to tire uniformity machine 10 in a manner that enables sensing face 54 to physically contact a circumferential tread 14 of tire 12 during force variation and run-out correction.

Radial run-out sensor 52 senses a target area 56, see FIG. 3A, on the center of circumferential tread 14 of tire 12 as the circumferential tread rotates past the fixed position of the radial run-out sensor. The radial run-out sensor 52 measures the distance R between the sensing face 54 and the target area 56 on circumferential tread 14. Target area 56 is preferably a circular area on the surface of tread 14 which is sufficiently large so as not to be affected by the height differences of the tread pattern. Radial run-out sensor 52 generates voltage signals which are proportional to distance R. These signals are sent from the radial run-out sensor 52, through electrical cable 58 to electrical signal conditioner 60 and then through electrical cable 61 to computer 36. In a uniform tire, distance R will not vary during a revolution of tire 12 and will be designated as the reference distance $R_o$. When radial run-out exists in tire 12, the distance R will vary throughout a revolution of tire 12.

The operation of the commercial current/power transducer 30, is an important aspect of the present invention. To remove material by grinding, grinding wheel 26 is advanced into contact with tire 12 so that there is interference between the tire and grinding wheel. Then, the grinding wheel 26 will remove material from tire 12 up to the depth of the interference. The abrasive action of grinding wheel 26 against tire 12 will be resisted by the tire material being removed until the material being ground off the tire is severed therefrom. This resistance is experienced by the grinding wheel as a moment acting in the direction opposite from the direction of rotation of the grinding wheel 26. The greater the depth of interference between tire 12 and grinding wheel 26, the greater the amount of material which the grinder will remove, and the greater the counter-moment experienced by the grinding wheel and motor 28. Thus, when grinding wheel 26 is in contact with tire 12, the work of grinding tire rubber causes an increased load on motor 28 from the counter-moment arising from the material being removed which is in excess of the load from merely rotating the grinding wheel. Since the speed of motor 28 and grinding wheel 26 are both directly proportional to the electric current powering the motor and inversely proportional to the load on the shaft (not shown) of the motor, increasing the load will cause the speed of the motor to decrease. The difference between the magnitude of the electric current when grinding wheel 26 is in contact with tire 12 and the magnitude of the current when the grinding wheel is not in contact with the tire is therefore proportional to the amount of grinding work being performed by the grinding wheel.

The amount of grinding work being performed by grinding wheel 26 must be continuously monitored to prevent the occurrence of certain detrimental effects which arise at higher rates of material removal. Excessive grinding causes the sections of tire 12 being ground to heat up rapidly and may cause melting or burning of the tire material. Furthermore, excessive grinding of tire 12 will cause the ground sections of the tire to have a poor cosmetic appearance. To prevent excessive grinding, a control program of computer 36 monitors the amount of grinding work being performed by grinding wheel 26 by the following process. The voltage signals generated by current/power transducer 30, which are proportional to the current/power flowing into motor 28, are continuously inputted and stored in computer 36 via electric signal conditioner 34 during the operation of center grinder assembly 24. Computer 36 subtracts a reference value representing the current/power in motor 28 when no grinding is occurring from the inputted signal to derive a grinding work signal.

Figure 4:
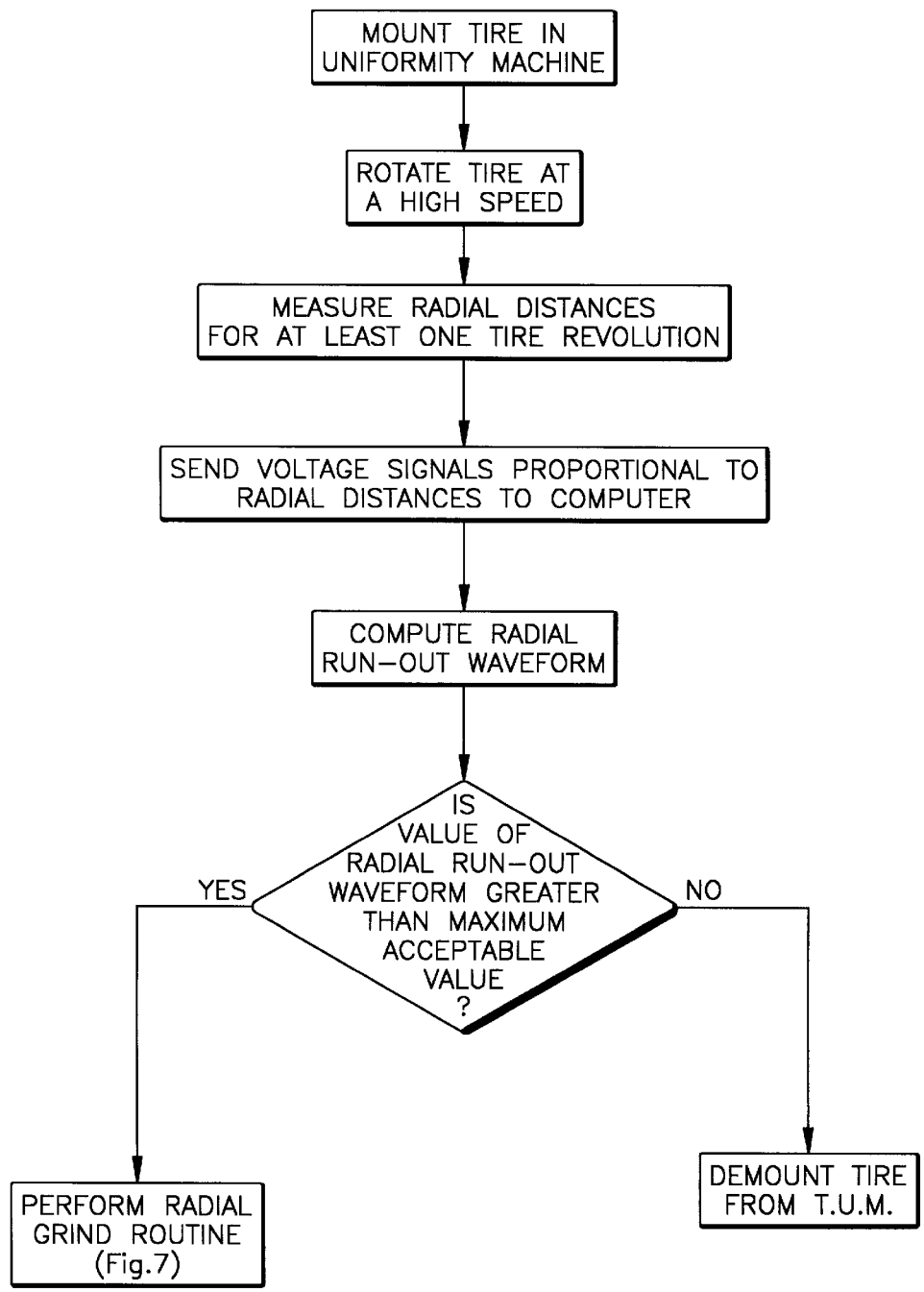
FIG. 4 is a flow diagram outlining the method of the present invention for correcting radial run-out and radial force variations.

The method of the present invention for correcting run-out, and radial force variations of a pneumatic tire using a tire uniformity machine, as outlined in FIG. 4, proceeds as follows. After mounting tire 12 on rim 18 of tire uniformity machine 10, the tire is inflated to a specified test pressure. Next, spindle 20 is rotated by motor 22 to bring rim 18 and tire 12 to a designated rotational speed above about 100 rpm and preferably above 200 rpm and most preferably above 350 rpm. Then, radial run-out sensor 52 measures the radial distances R at incremental units of degrees about the circumferential tread 14 for one revolution of tire 12. The voltage signals generated by the measurement of the radial distances R are sent to computer 36 via electrical signal conditioner 60 and stored as a radial distance waveform.

Computer 36 then mathematically operates on the voltage signals from the signal conditioner 60. If computer 36 determines that all values of the radial run-out waveform are at or below an acceptable maximum value of radial run-out, the computer will determine that no corrective grinding is necessary and will initiate action to cease the correction routine. If any value on the radial run-out waveform is above the acceptable maximum value of radial run-out, a control program of computer 36 directs the operations of center grinder assembly 24. In the preferred embodiment of the present invention, the grinding operations, as outlined below, are conducted if the radial run-out is beyond the acceptable maximum amount.

RADIAL RUN-OUT GRINDING ROUTINE

Figure 5:
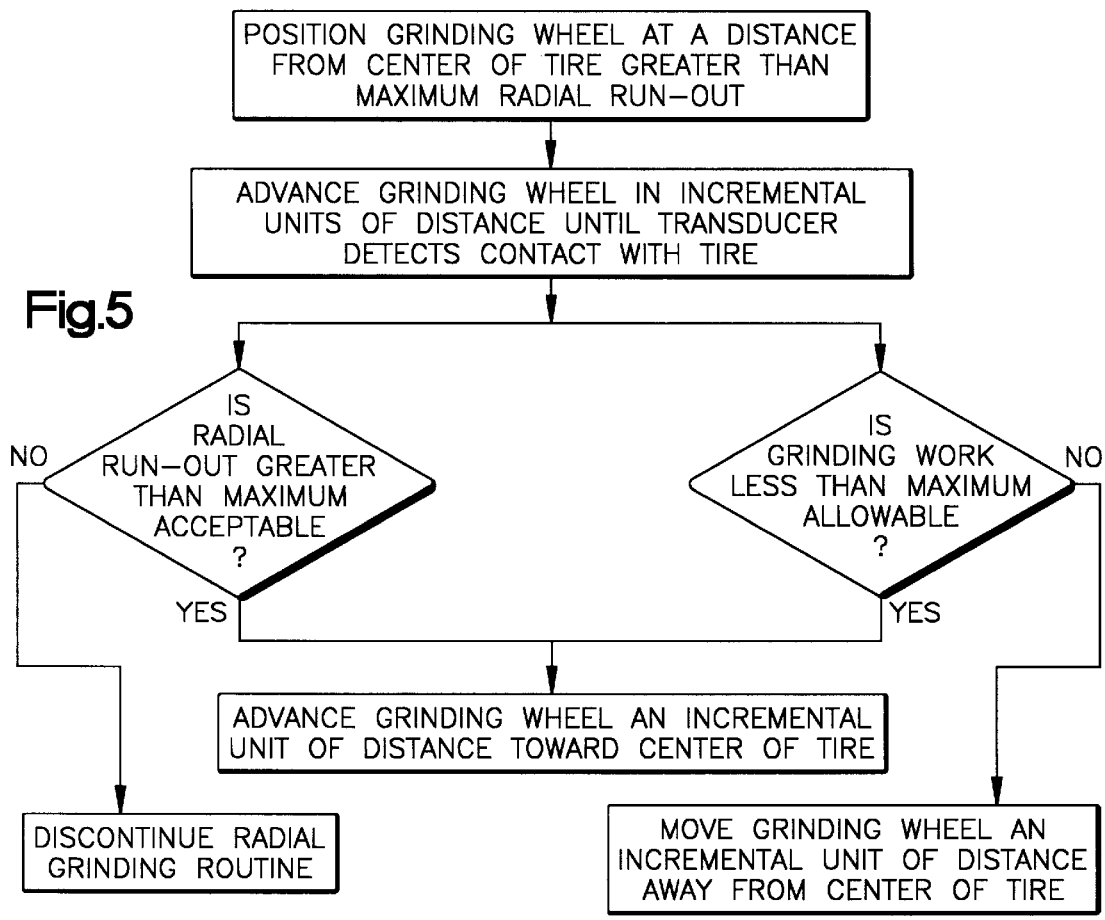
FIG. 5 is a flow diagram outlining the radial run-out grinding routine of the present invention.

The grinding routine to correct the radial run-out, as outlined in FIG. 5, is conducted using a control program in computer 36 and proceeds as follows. Grinding wheel 26 of center grinder assembly 24 is positioned so that grinding face 27 is located at a first position which is located at a distance from the center of tire 12 slightly greater than the position of maximum radial run-out of the tire as determined by the initial measurement of radial run-out. Then, the servo positioner advances center grinder assembly 24 in equal incremental units of distance toward the center of tire 12 until contact between grinding wheel 26 and circumferential tread 14 of tire 12 is detected by the current/power transducer device 30. Next, grinding wheel 26 is advanced in equal incremental units of distance toward the center of tire 12 for as long as radial run-out sensor 52 detects that run-out is present and current/power transducer 30 determines that the amount of grinding work does not exceed the maximum acceptable amount. The sections of tread 14 of tire 12 which contact grinding wheel 26 are those sections in which there is radial run-out. As grinding face 27 of grinding wheel 26 contacts the tire 12, material will be removed (i.e. ground) from the tire at these positions having radial run-out. When radial run-out sensor 52 measures the radial run-out at all incremental positions about circumferential tread 14 of less than or equal to the maximum acceptable amount of radial run-out, computer 36 will cause center grinder assembly 24 to be returned to an initial position on tire machine 10.

Although the preferred embodiment of the method of the present invention uses only center grinder assembly 24 with full-faced grinding wheel 26, it is also within the scope of the present invention to use both center grinder assembly 24 with a smaller grinding wheel to correct run-out at the center region of circumferential tread 14 and top and bottom shoulder grinders 40A,40B of shoulder grinder assembly 38 to correct radial run-out at the top and bottom shoulder regions of circumferential tread 14 of tire 12.

When all necessary grinding to correct the measured radial run-out has been completed, motor 22 decelerates spindle 20 until tire 12 is brought to standard test rotational speed. The specified force variation machine cycle resumes. Tire 12 may then be removed from rim 18 of tire uniformity machine 10 and routed for further processing.

After tire 12 has undergone the method of the present invention, three types of detrimental effects to tire performance should be reduced. As the correction method is specifically directed to measuring and grinding for radial run-out, radial run-out will be within acceptable limits and the attendant negative effects on tire performance will be minimized. Furthermore, due to run-out being a source of force variation, radial force variations should be reduced by the correction of radial run-out.

Figure 6A:
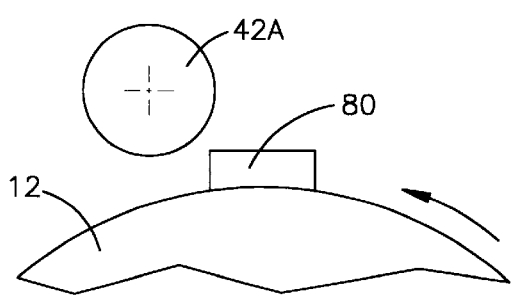
FIGS. 6A and 6B, collectively
Figure 6B:
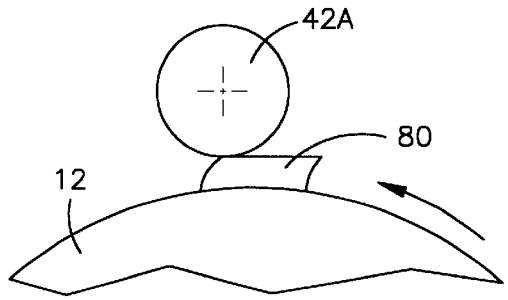
Figure 7:
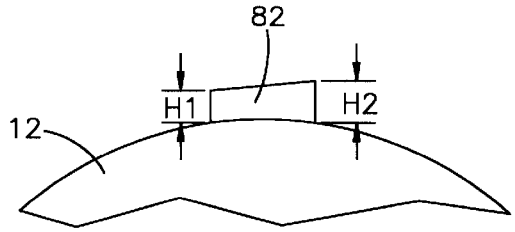
FIG. 7 is a side view of a simplified tread element of a typical pneumatic tire to demonstrate the feathering effect of low speed tire grinding.

Other important results of the method of the present invention arise from fact that tire 12 is rotating at a high speed while it is being ground. As centrifugal force is dependent upon the square of the rotational velocity, the greater the rotational speed, the greater the force experienced within the material of the tire. Individual tread elements 80 can be analogized to cantilevers, and as a grinding wheel comes into contact with a tread element, the force of contact caused by the tangential component of the centrifugal force of the rotating grinding wheel causes the cantilever-like tread element to bend, as diagramed in FIGS. 6A and 6B. Using the prior art method of grinding a tire which is rotating at a low speed, the bending of the tread elements during grinding causes "feathering" to result to the tread elements 82 of the tire after grinding has been completed, as illustrated in FIG. 7. That is, one side of the tread element 82 has a higher height $H_2$ than the other side $H_1$, i.e. $H_2 > H_1$. Due to the relatively high centrifugal forces acting in a tire rotating at a high speed, each tread element has considerable stiffness, so that the force of contact with a grinding wheel will cause only minimal bending of the cantilever-like element and thus minimal or no feathering results to a tire ground when rotating at a high speed. As it is believed that feathering of the tread may be one cause of tangential force variation, tangential force variation should also be reduced. Furthermore, as the tire is ground at a higher speed, a finer grained grinding wheel can be used to remove the same amount of rubber as compared to a rougher grinding wheel grinding a tire rotating at low speeds. The finer grained wheel provides a better grind finish which improves the cosmetic appearance of the tire.

It is apparent that there has been provided in accordance with this invention a method for correcting radial run-out and radial force variations of pneumatic tires on a tire uniformity machine. The routine for correcting the radial run-out and radial force variation of pneumatic tires on a tire uniformity machine includes the steps of first rotating a tire, which is at a state of standard test pressure, to a high speed, then incrementally advancing a center grinder assembly toward the center of the tire and removing material from the circumferential tread of the tire with each incremental advance while measuring radial run-out until the radial run-out at all points about the circumference of the tire are within an acceptable limit of radial run-out. The methods of the present invention are expected to reduce tangential force variation due to the effect of grinding the tire while the tire is rotating at a high speed.

While the invention has been described in combination with embodiments thereof, it is evident that many alternative modifications, and variations will be apparent to those skilled in the art in light of the foregoing teachings. Accordingly, the invention is intended to embrace all such modifications and variations as fall within the scope of the appended claims.

What is claimed is:

1. A method for correcting radial run-out of a pneumatic tire having a circumferential tread, comprising the steps of:
   a) rotating said tire about its axis of rotation at a speed that is greater than 100 rpm;
   b) positioning a center grinder, driven by a motor, adjacent to said tread;
   c) advancing said center grinder toward the center of said tire until said grinder contacts said tread;
   d) removing material from said tire with said center grinder;
   e) measuring values of radial run-out about the circumference of said tire;
   f) comparing the measured values of radial run-out of said tire with an acceptable maximum value of radial run-out; and
   g) if at least one of said measured values of radial run-out is greater than said acceptable maximum value of radial run-out, advancing said center grinder an incremental unit of distance toward said axis of rotation of said tire to remove additional material from sections of said tire having values of radial run-out greater than said acceptable maximum value;
   h) repeating steps e through g until all of said measured values of radial run-out are equal to or less than said acceptable maximum value of radial run-out;

and wherein the step g further includes the steps of:
   g1) measuring electric current/power flowing into said motor driving said grinder;
   g2) generating a voltage signal proportional to the amount of current/power flowing into said motor; and
   g3) subtracting a reference signal, corresponding to the amount of current/power flowing into said motor when said grinder is not in contact with said tire, from said voltage signal.

2. The method of claim 1 wherein step e further includes the steps of:
   e1) measuring radial distances, by a no-contact radial run-out sensor disposed adjacent to said tire tread, between a sensing face and a target area on said tread;

e2) inputting a signal from said sensor corresponding to said radial distances into a computer as a radial distance waveform; and e3) generating a radial run-out waveform corresponding to the difference between said radial distance waveform and a reference value.

3. The method of claim 1 further including the steps of:

i) positioning a first shoulder grinder adjacent a first tread shoulder of said tire;

j) advancing said first shoulder grinder an incremental unit of distance into contact with sections of said first tread shoulder having values of radial run-out greater than said acceptable maximum value;

k) grinding material from said sections of said first tread shoulder with said first shoulder grinder;

l) positioning a second shoulder grinder adjacent a second tread shoulder of said tire;

m) advancing said second shoulder grinder an incremental unit of distance into contact with sections of said second tread shoulder having values of radial run-out greater than said acceptable maximum value; and n) grinding material from said sections of said second tread shoulder with said second shoulder grinder.

4. The method of claim 1 wherein said speed is greater than 350 rpm.

5. A method for correcting radial run-out of a pneumatic tire having a circumferential tread, comprising the steps of:

a) rotating said tire about its axis of rotation at a speed that is greater than 100 rpm;

b) positioning a center grinder, driven by a motor, adjacent to said tread;

c) advancing said center grinder toward the center of said tire until said grinder contacts said tread;

d) removing material from said tire with said center grinder;

e) measuring values of radial run-out about the circumference of said tire;

f) comparing the measured values of radial run-out of said tire with an acceptable value of radial run-out;

g) if at least one of said measured values of radial run-out is greater than said acceptable maximum value of radial run-out, advancing said center grinder an incremental unit of distance toward said axis of rotation of said tire to remove additional material from sections of said tire having values of radial run-out greater than said acceptable maximum value; and h) repeating steps e through g until all of said measured values of radial run-out are equal to or less than said acceptable maximum value of radial run-out.

6. The method of claim 5 wherein step e further includes the steps of:

e1) measuring radial distances, by a no-contact radial run-out sensor disposed adjacent to said tire tread, between a sensing face and a target area on said tread;

e2) inputting a signal from said sensor corresponding to said radial distances into a computer as a radial distance waveform; and e3) generating a radial run-out waveform corresponding to the difference between said radial distance waveform and a reference value.

7. The method of claim 6 further including the steps of:

i) positioning a first shoulder grinder adjacent a first tread shoulder of said tire;

j) advancing said first shoulder grinder an incremental unit of distance into contact with sections of said first tread shoulder having values of radial run-out greater than said acceptable maximum value;

k) grinding material from said sections of said first tread shoulder with said first shoulder grinder;

l) positioning a second shoulder grinder adjacent a second tread shoulder of said tire;

m) advancing said second shoulder grinder an incremental unit of distance into contact with sections of said second tread shoulder having values of radial run-out greater than said acceptable maximum value; and n) grinding material from said sections of said second tread shoulder with said second shoulder grinder.

8. The method of claim 5 wherein said speed is greater than 350 rpm.

* * * * *